US010277595B2

(12) United States Patent
Lai et al.

(10) Patent No.: US 10,277,595 B2
(45) Date of Patent: Apr. 30, 2019

(54) IDENTITY RECOGNITION WITH LIVING SIGNATURES FROM MULTIPLE DEVICES

(71) Applicant: International Business Machines Corporation, Armonk, NY (US)

(72) Inventors: Jui-Hsin Lai, White Plains, NY (US); Yinglong Xia, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 14/966,314

(22) Filed: Dec. 11, 2015

(65) Prior Publication Data

US 2017/0171202 A1 Jun. 15, 2017

(51) Int. Cl.
*H04L 29/06* (2006.01)
*G06F 21/64* (2013.01)

(52) U.S. Cl.
CPC .............. *H04L 63/10* (2013.01); *G06F 21/64* (2013.01); *H04L 63/0861* (2013.01)

(58) Field of Classification Search
CPC .......... G06F 21/32; G06F 21/31; G06F 21/30; G06F 21/35; G06F 1/163;
(Continued)

(56) References Cited

U.S. PATENT DOCUMENTS 6,957,337 B1 10/2005 Chainer et al.
7,047,418 B1 5/2006 Ferren et al.
(Continued)

FOREIGN PATENT DOCUMENTS

CN 103065076 A 4/2013
WO 2013/109154 A1 7/2013

OTHER PUBLICATIONS

Lawrence O'Gorman, "Comparing Passwords, Tokens, and Biometrics for User Authentication", IEEE, vol. 91, No. 12, Dec. 2003, Retrieved From https://ieeexplore.ieee.org/abstract/document/1246384 (Year: 2003).*

(Continued)

*Primary Examiner* — Chau Le
(74) *Attorney, Agent, or Firm* — Scully, Scott, Murphy & Presser, PC; Daniel P. Morris

(57) ABSTRACT

Identity recognition is achieved using user's living signatures, such as a heartbeat signal, from multiple devices. A user requests identity recognition for using a first registered device, such as a mobile device. The request is provided to a cloud. When the cloud confirms the mobile device is a registered device, the cloud directs the first registered device to upload the user living signature to the cloud. The cloud also sends a request to a user second registered device to upload the user living signature from the second registered device to the cloud. The user second registered device may be a headband monitor, watch, Google glasses, or the like capable of monitoring and uploading the user living signature to the cloud. The cloud compares both living signature signals from the first registered device and from the second registered device. If the signals are matched, the user identity is confirmed. If the signals are not matched, the user identity is not confirmed. Preferably the first registered device is a mobile device.

20 Claims, 3 Drawing Sheets

(58) Field of Classification Search
CPC .............. G06F 2221/2129; G06F 21/64; H04L 63/0861; H04L 63/08; H04L 9/3231; H04L 63/0853; H04L 63/10; H04W 12/06
See application file for complete search history.

(56) References Cited

U.S. PATENT DOCUMENTS

| | | | |
|---|---|---|---|
| 7,171,680 B2 | 1/2007 | Lange | |
| 7,536,557 B2 | 5/2009 | Murakami et al. | |
| 8,747,336 B2 | 6/2014 | Tran | |
| 8,934,839 B2 | 1/2015 | Singh | |
| 2006/0095369 A1* | 5/2006 | Hofi | G06Q 20/10 705/39 |
| 2006/0195041 A1* | 8/2006 | Lynn | A61B 5/412 600/538 |
| 2010/0063419 A1* | 3/2010 | Mostafavi | A61B 5/1135 600/587 |
| 2013/0005266 A1* | 1/2013 | Singh | H04W 4/008 455/41.2 |
| 2013/0173926 A1 | 7/2013 | Morese et al. | |
| 2013/0268444 A1* | 10/2013 | Namgoong | G06Q 20/40145 705/71 |
| 2014/0101453 A1* | 4/2014 | Senthurpandi | H04L 63/0861 713/172 |
| 2014/0148709 A1 | 5/2014 | Gu et al. | |
| 2014/0159862 A1 | 6/2014 | Yange et al. | |
| 2014/0165185 A1 | 6/2014 | Lange | |
| 2014/0188770 A1 | 7/2014 | Agrafioti et al. | |
| 2014/0359722 A1 | 12/2014 | Schultz et al. | |
| 2014/0366159 A1 | 12/2014 | Cohen | |
| 2015/0120557 A1* | 4/2015 | Zhang | G06Q 20/40145 705/44 |
| 2015/0135310 A1* | 5/2015 | Lee | A61B 5/681 726/20 |
| 2015/0235017 A1* | 8/2015 | Oberheide | G06F 21/32 726/6 |
| 2015/0278498 A1* | 10/2015 | Hong | G06F 21/32 340/5.82 |
| 2015/0378433 A1* | 12/2015 | Savastinuk | G06K 9/00255 345/156 |
| 2016/0219047 A1* | 7/2016 | Jayaraman | A61B 5/04842 |
| 2017/0012821 A1* | 1/2017 | Sa | G06F 1/1632 |
| 2017/0034160 A1* | 2/2017 | Brands | H04L 63/0861 |
| 2017/0076000 A1* | 3/2017 | Ashoori | G06F 17/30867 |
| 2017/0142589 A1* | 5/2017 | Park | H04W 12/08 |
| 2017/0162072 A1* | 6/2017 | Horseman | G09B 19/00 |

OTHER PUBLICATIONS

Phua et al., "Heart sound as a biometric.", Science Direct, Pattern Recognition 41.3 (2008): pp. 906-919.
Tronci et al., "Designing multiple biometric systems:Measures of ensemble effectiveness", Engineering Applications of Artificial Intelligence 22 (2009) pp. 66-78.

* cited by examiner

IDENTITY RECOGNITION WITH LIVING SIGNATURES FROM MULTIPLE DEVICES

BACKGROUND

Aspects of the present invention generally relate to a method, apparatus, and computer program product for identity recognition with living signatures from multiple devices. Specifically, aspects of the invention relate to using live heartbeat signals from multiple devices, without using a stored living signature in a database, for identity recognition or authorization.

Identity recognition on mobile devices is an emergent demand for many applications on the internet. Among the challenges is that the features used for identity recognition should be robust to various circumstances such as not being copied, be specific to the user, and be able to apply to mobile devices. Existing services such as ApplePay uses fingerprints as a feature for identification. However, fraud is easy to achieve by duplicating a fingerprint. Therefore it is desirable to design an identification system with high safety, robustness, and mobility.

SUMMARY

Aspects of the invention are a method, apparatus, and computer readable program for identity recognition with living signatures from multiple devices. Embodiments of the invention primarily concern determining the identity of a user or authorizing a user by using a living signature, such as live heartbeat signals combining cloud computation and mobile service to meet the foregoing challenges.

An exemplary apparatus for identity recognition system using living signatures from multiple devices comprises a user first registered device initiating a user identity recognition request; a user second registered device capable of monitoring and uploading living signatures to the cloud; and a cloud receiving the user identity recognition request from the first registered device and verifying that the request is from the user first registered device and directing the first registered device to upload a living signature from the first registered device to the cloud and sending a request to the user second registered device to upload a user living signature to the cloud for confirming the identity of the user of the user first registered device.

An exemplary method of identity recognition using living signatures from multiple devices comprises initiating a user identity recognition request from a user first registered device to a cloud; verifying at the cloud that the request is from a user first registered device and directing the first registered device to upload a user living signature to the cloud; sending a request from the cloud to a user second registered device to upload a user living signature to the cloud; and matching both of the uploaded living signatures for identity recognition where if both living signatures are matched the user identity is confirmed on the first registered device and if both living signatures are not matched the user identity is not confirmed on the first registered device.

An exemplary non-transitory, computer readable medium having computer readable program for identity recognition using living signatures from multiple devices, comprises initiating a user identity recognition request from a user first registered device to a cloud; verifying at the cloud that the request is from a user first registered device and directing the first registered device to upload a user living signature to the cloud; sending a request from the cloud to a user second registered device to upload a user living signature to the cloud; and matching both of the uploaded living signatures for identity recognition where if both living signatures are matched the user identity is confirmed on the first registered device and if both living signatures are not matched the user identity is not confirmed on the first registered device.

The objects, features, and advantage of the present disclosure will become more clearly apparent when the following description is taken in conjunction with the accompanying drawings.

DETAILED DESCRIPTION OF PREFERRED EMBODIMENTS

Figure 1:
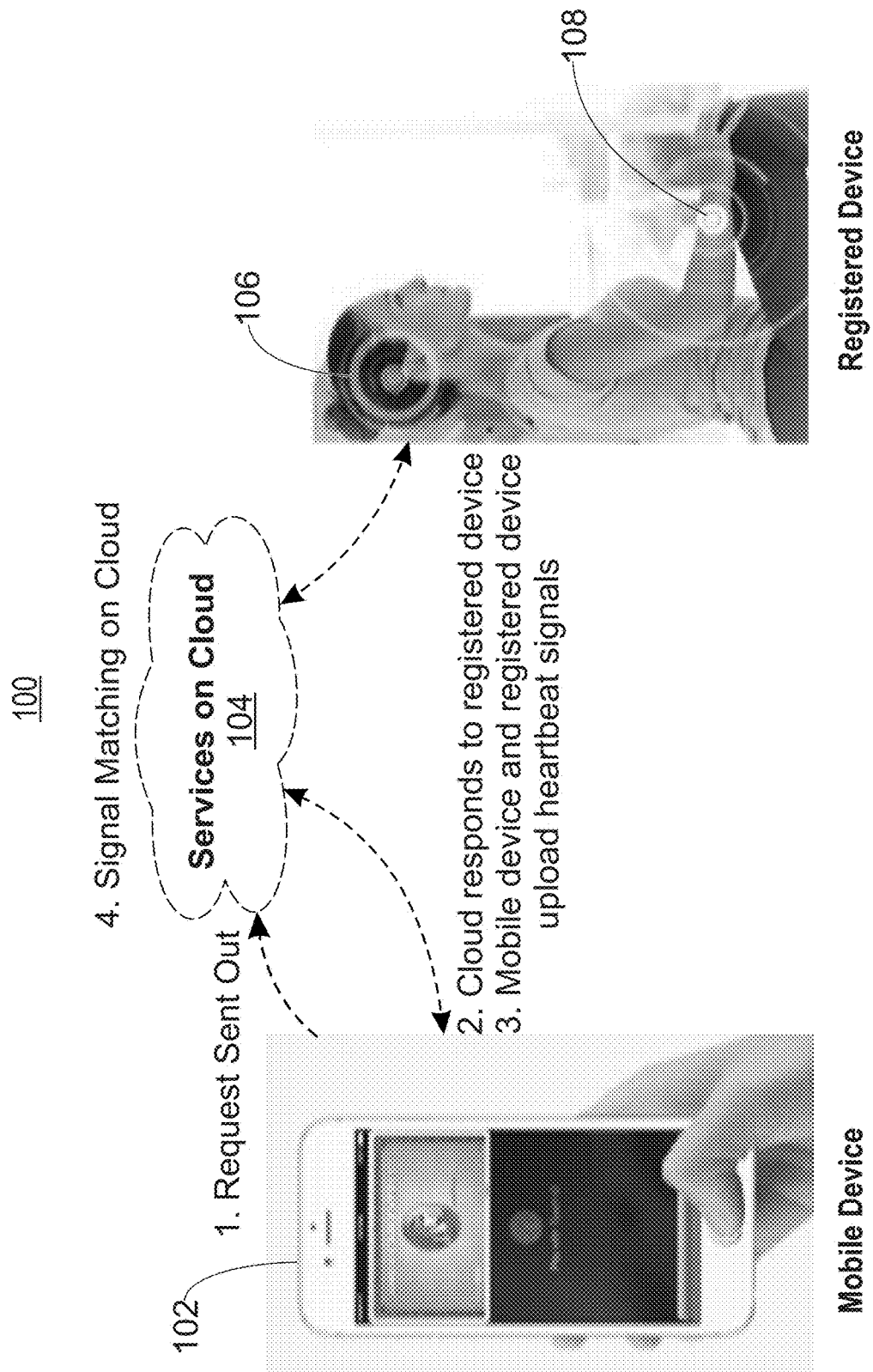
FIG. 1 illustrates an embodiment of the invention.

Sensing and monitoring biological parameters or so-called living signatures can be used to identify individuals, and/or confirm their identity. These approaches sometimes are referred to as biometrics, that is, identification based on individuals' characteristic biology. Signals used in biometric evaluation may have advantages, for example in that counterfeiting biological traits can be extremely difficult. Thus, validating an individual based on biometric parameters may provide a high level of confidence that an individual is in fact who he or she claims to be, is authorized to use some device or access information, etc.

However, conventional biometric systems may be cumbersome, and/or limited in their usability. For example, a system based on fingerprint identification might require a user to place one or more fingers on a scanning pad, and hold them there while the system reads and evaluates the user's prints. A system that uses retinal recognition might require a user to look into a camera for some period with an eye fixed and open, etc. The scanned biometric is evaluated with a previously stored biometric signal of the fingerprint or retina scan in the examples cited.

There are existing identity recognition applications. For example, data is usually protected by a password, security may be accomplished using a key, badge, or eye-scanner, and purchases may be made using a credit card or fingerprint.

Challenges to these identity recognition applications include duplication. Signatures used for recognition should not be copied and passwords are not safe due to easy duplication. Also, the signatures should be robust and some living bio-signatures are changing, such as heartbeat signals. In addition, there is a need for privacy and signatures for identification are personal and only the user can provide the signature. Finally, the recognition process has to run on mobile devices. Commonly employed user id and passwords are straightforward for the user's convenience but they are easy to be hacked, for instance by memorization.

There are existing solutions which use heartbeats as the identification where the user's heartbeat signature is compared to a database. The advantage of a heartbeat signature is that the heartbeat is a more personal feature than using a password. The negative is that the heartbeat is variant overtime, e.g., walking, sitting, or standing changes the heartbeat. The recognition rate for heartbeat signatures when comparing to a heartbeat signature stored in a database is low.

Fingerprint as the identification compares a user's fingerprint to a database of stored fingerprints. The advantage is that the fingerprint is more personal for the user that using a password and it can be detected on high-end mobile devices. The drawback is that the fingerprint is easy to copy.

Use of an eye scan for identification compares the user's eye scan to a database. The eye scan is a more personal signature for user than using a password and it is robust to environment changes. The disadvantages are that it is not easy to detect on a mobile device and less convenient than some other approaches.

As used herein it will be understood that living signatures, biometric signatures, and biometric signals include, but are not limited to, heartbeat signals.

An aspect of the invention is matching living signatures concurrently received from multiple devices instead of matching a received living signal to a database of stored living signatures or biometric historical data. Preferably, there are two mobile devices. One device is a registered mobile device and the other device is registered with an authority and living signatures from both devices have to be substantially identical to confirm the user's identity since they are taken at the same time.

In an exemplary embodiment, the biophysical signal data is a heart rate or heart frequency calculated by the wireless-enabled mobile device. Additionally or alternatively, the biophysical signal data may be a heartbeat wavelength or some other pattern(s) or number(s) calculated based on the pumping action of the heart. In some examples, the biophysical signal data may be related to, based on, or otherwise indicative of other characteristics of the user such as blood pressure, body temperature, etc.

Referring to FIG. 1, there is shown a drawing of an exemplary embodiment 100 of the invention. A user registered mobile device 102 sends a request to be authorized or identified to use the mobile device. The request is initiated for example by placing a finger on the mobile phone. The request is sent to services on cloud 104. The cloud confirms the signal is from the user registered mobile device and responds by sending a signal to another previously registered device of the user such as a user's headset monitor 106 or a wristband monitor 108. Both the mobile device 102 and the registered device 106 or 108 monitor and upload living biometric signals, such as real-time heartbeat signals, to the cloud 104. The heartbeat signals from both registered devices are monitored from the same user at the same time under the same condition and are uploaded to the cloud and matching is performed without the use of previously stored user heartbeat signal. The cloud performs signal matching of both of the heartbeat signals for identity recognition of the user. If both signals match, the identity of the user is authenticated. Otherwise, if there is not a match, the user is not authenticated.

Figure 2:
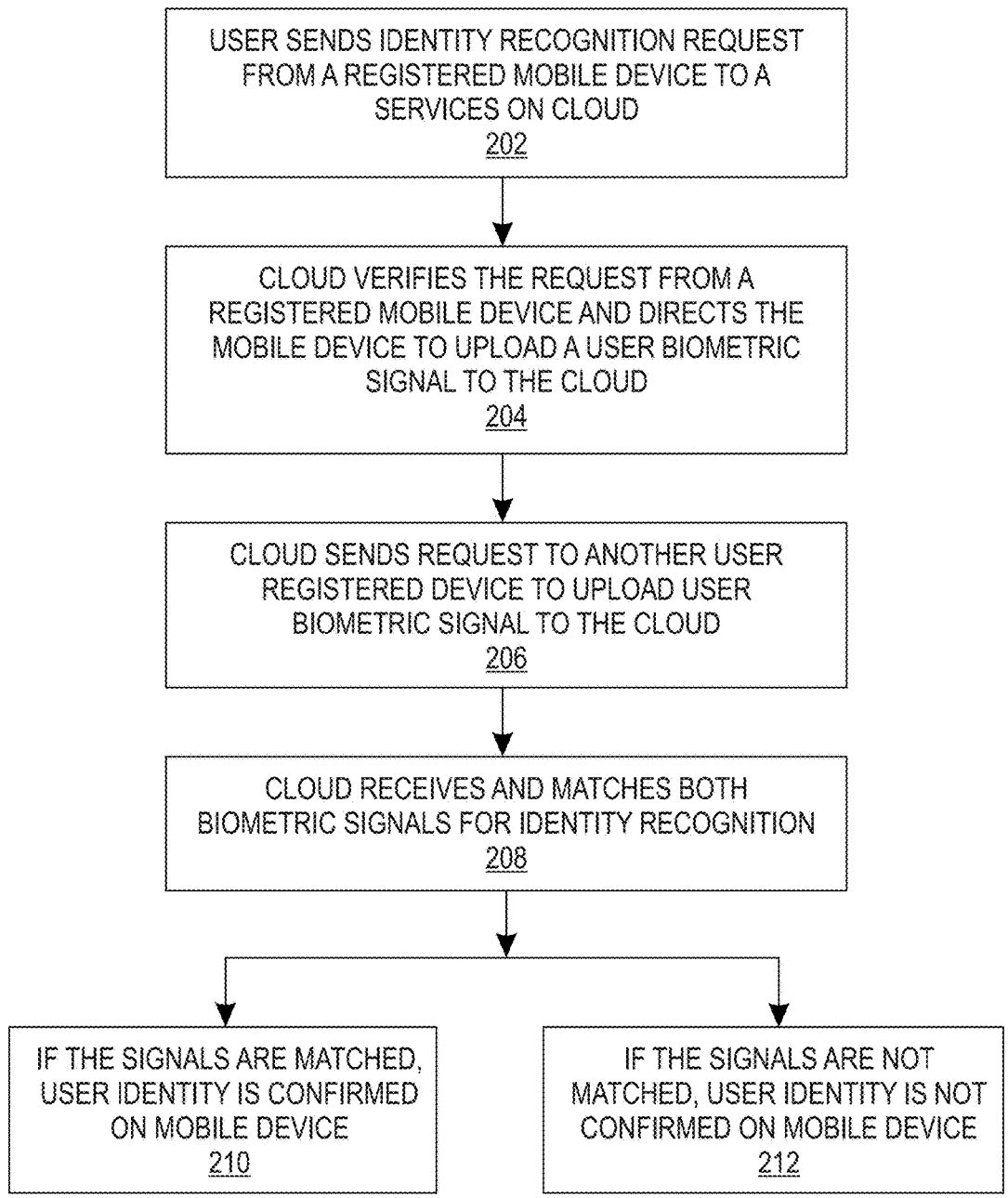
FIG. 2 is a flow chart of a method of practicing an aspect of the invention.

FIG. 2 is a flow chart of a method 200 of practicing an aspect of the invention. The user sends an identity recognition request from a user registered device to a services on cloud 202 by a click or finger recognition on a registered mobile device. Preferably, the user registered device is a mobile device.

The cloud responds to the registered mobile device by verifying the request being from the user registered device and directs the user registered device to upload a user living biometric signal, such as a heartbeat, to the cloud 204. The cloud also sends a request to another user registered device, such as a heartbeat belt, Google glasses, or a watch, capable of measuring and uploading heartbeat signals to the cloud to upload a user living biometric signal 206. The uploaded living biometric signals from each registered device are the same type of signal from the user, e.g., heartbeat signals.

The real-time heartbeat signals from both the registered mobile device and the other registered device are uploaded to the cloud where the two heartbeat signals undergo signal matching for user identity recognition on the cloud 208. The signals are compared for similarity of the two real-time, living biometric signatures. The signal matching compares temporal variation of the signals and computes signal similarity of the signals. When the two signals are deemed to be highly identical or matched, positive identification of the user with the mobile device is confirmed 210. When the two signals are deemed not to be highly identical positive or matched, identification of the user is not confirmed 212.

The technique is robust to environment changes. Living signatures from a user from multiple devices are identical under conditions of walking, running, or sitting. Comparison of living heartbeat signatures to heartbeat signals stored in a database is impractical and hence, embodiments of the invention provide a superior method of identifying a user using a mobile device.

The heartbeat signatures cannot be copied because the signature changes all the time for the user.

The heartbeat signal is immediately detectable, significant, and easy to detect. The heartbeat signal can be detected from many different devices such as watches, finger touch, belt, cameras, and the like.

One algorithm for use in signal matching is a dynamic time warping (DTW) algorithm. DTW algorithms find an optimal path for matching two templates with different lengths, are good for short-length recognition patterns, and the computationally efficient and exhibit a high recognition rate.

Figure 3:
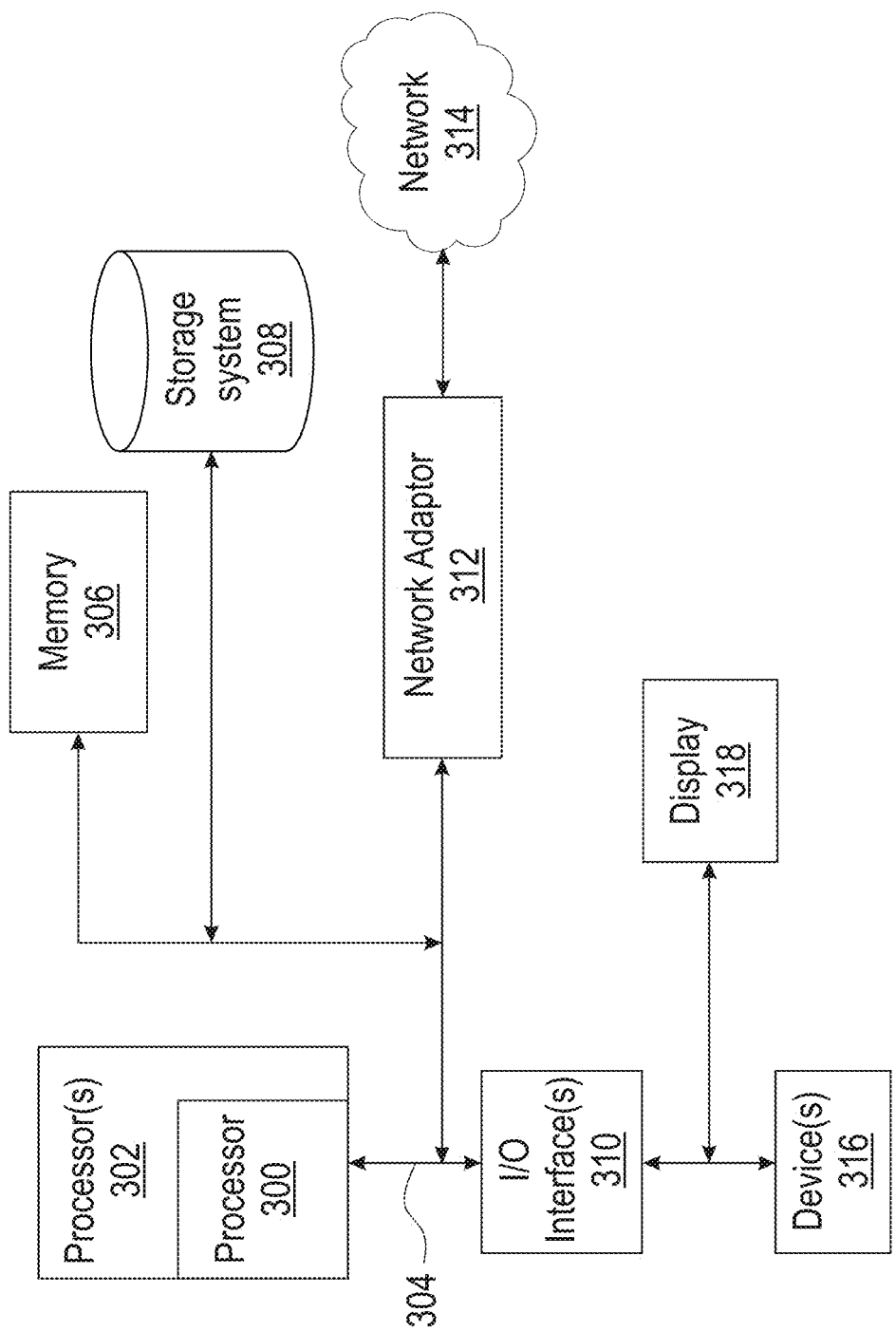
FIG. 3 is a schematic block diagram of a computer system for practicing various embodiments of the invention.

FIG. 3 illustrates a schematic diagram of an example computer or processing system that may implement the identity recognition of a user with living signatures from multiple devices in one exemplary embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 302, a system memory 306, and a bus 304 that couples various system components including system memory 306 to processor 302. The processor 302 may include a module 300 that performs the methods described herein. The module 300 may be programmed into the integrated circuits of the processor 302, or loaded from memory 306, storage device 308, or network 314 or combinations thereof.

Bus 304 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 306 can include computer system readable media in the form of volatile memory, such as random access memory (RAM) and/or cache memory or others. Computer system may further include other removable/non-removable, volatile/non-volatile computer system storage media. By way of example only, storage system 308 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 304 by one or more data media interfaces.

Computer system may also communicate with one or more external devices 316 such as a keyboard, a pointing device, a display 318, etc.; one or more devices that enable a user to interact with computer system; and/or any devices (e.g., network card, modem, etc.) that enable computer system to communicate with one or more other computing devices. Such communication can occur via Input/Output (I/O) interfaces 310.

Still yet, computer system can communicate with one or more networks 314 such as a local area network (LAN), a general wide area network (WAN), and/or a public network (e.g., the Internet) via network adapter 312. As depicted, network adapter 312 communicates with the other components of computer system via bus 304. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An identity recognition system using biological parameters from multiple mobile devices comprising:
a user first registered mobile device initiating a user identity recognition request to a cloud;
a user second registered mobile device, registered with an authority, capable of monitoring and uploading real-time biological parameters to the cloud; and
the cloud receiving the user identity recognition request from the first registered mobile device and verifying that the request is from the user first registered mobile device and directing the first registered device to upload a real-time biological parameter from the first registered mobile device to the cloud and sending a request to the user second registered mobile device to upload a user real-time biological parameter to the cloud and matching the real-time biological parameter from the first registered mobile device with the real-time biological parameter from the second registered mobile device for confirming the identity of the user of the user first registered device, the matching comprising: subjecting both real-time biological parameters concurrently monitored by the user first registered mobile device and the user second registered mobile device received at the cloud to a time series analysis for measuring similarity between both the real-time biological parameters and if both the real-time biological parameters concurrently monitored with each other are similar the user identity is confirmed on the first registered mobile device and if both real-time biological parameters concurrently monitored with each other are not similar the user identity is not confirmed on the first registered mobile device.

2. The identity recognition system as set forth in claim 1, wherein the real-time biological parameter is a biometric signal.

3. The identity recognition system as forth in claim 2, wherein the biometric signal is a heartbeat signal.

4. The identity recognition system as set forth in claim 2, wherein the biometric signal is a heartbeat wavelength or other pattern(s) or number(s) calculated based on the pumping action of the heart, blood pressure, or body temperature.

5. The identity recognition system as set forth in claim 1, wherein the user first registered device is a mobile device.

6. The identity recognition system as set forth in claim 1, wherein the user second registered mobile device is a device capable of monitoring and uploading user real-time biological parameters to the cloud.

7. The identity recognition system as set forth in claim 6, wherein the user second registered mobile device is selected from the group consisting of heartbeat belt, Google glasses, or a watch.

8. A method of identity recognition using biological parameters from multiple mobile devices comprising:

initiating a user identity recognition request from a user first registered mobile device to a cloud;

verifying at the cloud that the request is from a user first registered mobile device and directing the first registered mobile device to upload a user real-time biological parameter to the cloud;

sending a request from the cloud to a user second registered mobile device, registered with an authority, to upload a user real-time biological parameter to the cloud; and matching both of the uploaded real-time biological parameters concurrently monitored by the user first registered mobile device and the user second registered mobile device received at the cloud with each other for identity recognition where both real-time biological parameters are subject to a time series analysis for measuring similarity between the real-time biological parameters and if both real-time biological parameters concurrently monitored with each other are similar the user identity is confirmed on the first registered mobile device and if both real-time biological parameters concurrently monitored with each other are not similar the user identity is not confirmed on the first registered mobile device.

9. The method of identity recognition as set forth in claim 8, wherein the real-time biological parameter is a biometric signal.

10. The method of identity recognition as set forth in claim 9, wherein the biometric signal is a heartbeat signal.

11. The method of identity recognition system as set forth in claim 9, wherein the biometric signal is a heartbeat wavelength or other pattern(s) or number(s) calculated based on the pumping action of the heart, blood pressure, or body temperature.

12. The method of identity recognition as set forth in claim 8, wherein the user first registered device is a mobile device.

13. The method of identity recognition as set forth in claim 8, wherein the user second registered mobile device is a device capable of monitoring and uploading real-time biological parameters.

14. The method of identity recognition as set forth in claim 13, wherein the user second registered mobile device is selected from the group consisting of heartbeat belt, Google glasses, or a watch.

15. A non-transitory computer readable medium having computer readable program for identity recognition using biological parameters from multiple mobile devices, comprising:

initiating a user identity recognition request from a user first registered mobile device to a cloud;

verifying at the cloud that the request is from a user first registered mobile device and directing the first registered device to upload a user real-time biological parameter to the cloud;

sending a request from the cloud to a user second registered mobile device, registered with an authority, to upload a user real-time biological parameter to the cloud; and matching both of the uploaded real-time biological parameters concurrently monitored by the user first registered mobile device and the user second registered mobile device received at the cloud with each other for identity recognition where both real-time biological parameters are subject to a time series analysis for measuring similarity between the real-time biological parameters and if both real-time biological parameters concurrently monitored with each other are similar the user identity is confirmed on the first registered mobile device and if both real-time biological parameters concurrently monitored with each other are not similar the user identity is not confirmed on the first registered mobile device.

16. The non-transitory computer readable medium having computer readable program as set forth in claim 15, wherein the real-time biological parameter is a biometric signal.

17. The non-transitory computer readable medium having computer readable program as set forth in claim 16, wherein the biometric signal is a heartbeat signal.

18. The non-transitory computer readable medium having computer readable program as set forth in claim 16, wherein the biometric signal is a heartbeat wavelength or other pattern(s) or number(s) calculated based on the pumping action of the heart, blood pressure, or body temperature.

19. The non-transitory computer readable medium having computer readable program as set forth in claim 15, wherein the user first registered device is a mobile device.

20. The non-transitory computer readable medium having computer readable program as set forth in claim 15, wherein the user second registered mobile device is a device capable of monitoring and uploading real-time biological parameters.

* * * * *